United States Patent
Morales et al.

(10) Patent No.: US 10,406,735 B2
(45) Date of Patent: Sep. 10, 2019

(54) INJECTION MOLDED PART WITH INSERT FILM

(71) Applicant: Dura Operating, LLC, Auburn Hills, MI (US)

(72) Inventors: Alberto Polonio Morales, West Bloomfield, MI (US); Sai Her, Warren, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 561 days.

(21) Appl. No.: 15/052,053

(22) Filed: Feb. 24, 2016

(65) Prior Publication Data
US 2017/0239861 A1    Aug. 24, 2017

(51) Int. Cl.
*B32B 27/06* (2006.01)
*B29C 45/16* (2006.01)
*B32B 27/36* (2006.01)
*B60R 13/02* (2006.01)
*B29K 69/00* (2006.01)
*B29L 31/30* (2006.01)
*B29C 45/14* (2006.01)

(52) U.S. Cl.
CPC .......... *B29C 45/1671* (2013.01); *B32B 27/06* (2013.01); *B32B 27/365* (2013.01); *B60R 13/02* (2013.01); *B29C 45/1679* (2013.01); *B29C 2045/14713* (2013.01); *B29K 2069/00* (2013.01); *B29K 2995/0029* (2013.01); *B29L 2031/30* (2013.01); *B32B 2307/414* (2013.01)

(58) Field of Classification Search
CPC ...................................................... B29C 45/167
USPC ........................................ 428/913.3, 31, 203
See application file for complete search history.

(56) References Cited

U.S. PATENT DOCUMENTS

| | | | |
|---|---|---|---|
| 4,292,827 A * | 10/1981 | Waugh | B05D 1/30 29/412 |
| 5,909,901 A | 6/1999 | Zillig et al. | |
| 7,674,414 B2 | 3/2010 | Neitzke | |
| 7,981,342 B2 | 7/2011 | Hayes et al. | |
| 8,071,000 B2 | 12/2011 | Neitzke | |
| 8,083,979 B2 | 12/2011 | Hayes et al. | |
| 2014/0242378 A1 | 8/2014 | Curnutt | |
| 2015/0145240 A1 | 5/2015 | Kujawski et al. | |

FOREIGN PATENT DOCUMENTS

| | | |
|---|---|---|
| DE | 4124297 A1 | 1/1993 |
| DE | 4301444 A1 | 7/1994 |
| DE | 102010020039 A1 | 11/2011 |
| EP | 3088156 A1 | 11/2016 |
| JP | 3406731 B2 | 5/2003 |

* cited by examiner

*Primary Examiner* — William P Watkins, III
(74) *Attorney, Agent, or Firm* — Robert E. Ford; Raymond J. Vivacqua; Steven L. Crane

(57) ABSTRACT

An injection molded part for a motor vehicle includes a film layer having a film main portion and a film first side portion that ends in a first film side surface, wherein the film first side portion extends from the film main portion in a direction different than a plane defined by the film main portion. The film layer also includes a film outer surface and a film inner surface disposed opposite the film outer surface. A first polymer layer is in contact with the film inner surface. A second polymer layer is in contact with the film outer surface, the film first side surface and the first polymer layer.

19 Claims, 4 Drawing Sheets

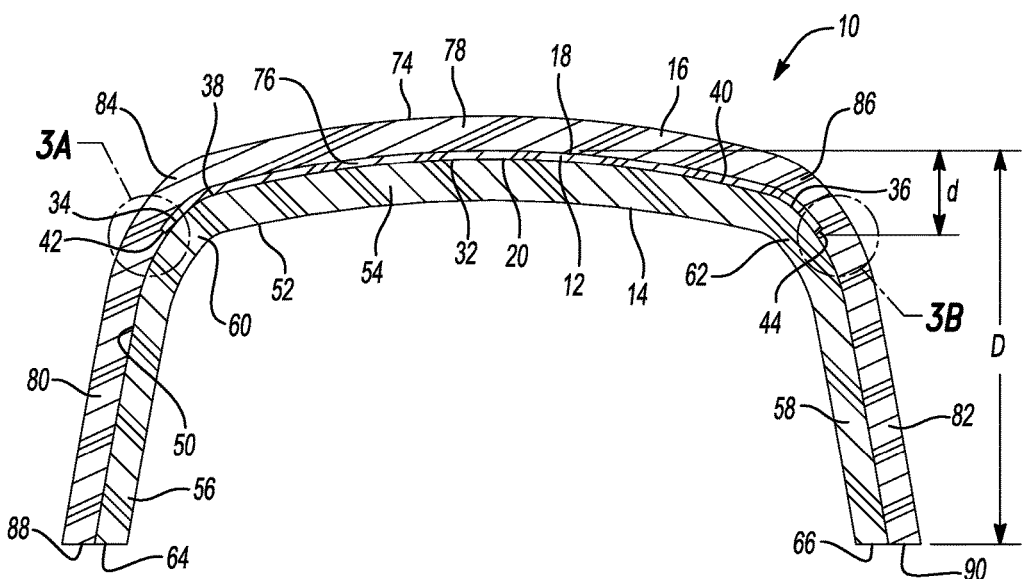
*Fig-3*
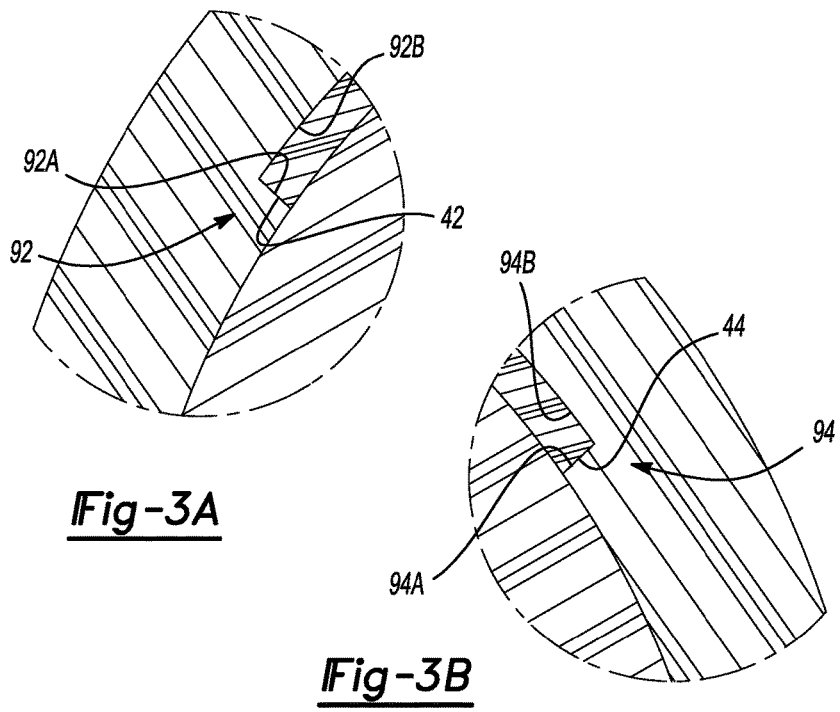
*Fig-3A*
*Fig-3B*

INJECTION MOLDED PART WITH INSERT FILM

FIELD

The invention relates generally to an injection molded part for a motor vehicle, and more particularly to an injection molded part for a motor vehicle having an insert film camouflaged along the perimeter.

BACKGROUND

The statements in this section merely provide background information related to the present disclosure and may or may not constitute prior art.

A typical motor vehicle has numerous injection molded parts, ranging from large body panels to decorative interior trim. These parts are formed by forcing or injecting a viscous material, such as a thermoplastic or thermosetting polymer, into a mold or cavity having the desired shape of the part. Thermoplastics are generally injected under elevated temperatures while thermosets are generally comprised of two different chemical components that crosslink and cure within the mold. The mold itself may take any number of shapes and forms and have multiple cavities.

Machined components, insert molding films, or other pre-molded components may be inserted into the mold to allow the material injected into the mold to solidify around the component to create the injection molded parts. Additional materials, such as clear coatings, may then be molded onto the part in subsequent injection molding operations. The insert molding operation is especially useful in creating decorative interior trim parts that have attractive designs, high quality surface finishes, depth of image, and distinctness.

However, the dimensions and complexity of the injection molded part are limited by the inclusion of the insert film or decorative layer. These films are heat treated to curve or bend the film before placement in the mold. However, the film is limited in depth, measured from a top of the film to the bent edges, to approximately 10 mm. Thus, in order to hide the transition of the film to the injected material, the injection molded part is limited in depth to the edge of the film. While these injection molded parts are useful for their intended purpose, there is a need in the art for more complex injection molded part designs that are not limited to the depth of the film and which have desirable aesthetic and design features.

SUMMARY

An injection molded part for a motor vehicle is provided. The injection molded part includes a film layer having a film main portion and a film first side portion that ends in a first film side surface, wherein the film first side portion extends from the film main portion in a direction different than a plane defined by the film main portion. The film layer also includes a film outer surface and a film inner surface disposed opposite the film outer surface. A first polymer layer is in contact with the film inner surface. A second polymer layer is in contact with the film outer surface, the film first side surface, and the first polymer layer.

In one aspect of the injection molded part, the first polymer layer includes a first side surface which extends past the film first side surface.

In another aspect of the injection molded part, a distance between the first side surface of the first polymer layer and the film outer surface is greater than 11 mm.

In another aspect of the injection molded part, the film layer includes a film second side portion extending from the main portion in a direction different than the plane defined by the film main portion, wherein the film second side portion ends in a second film side surface.

In another aspect of the injection molded part, the first polymer layer includes a first transition region disposed between the main portion and the first side portion.

In another aspect of the injection molded part, the first transition region has an arcuate profile.

In another aspect of the injection molded part, the film first side surface is substantially disposed at a midpoint of the first transition region.

In another aspect of the injection molded part, the first polymer layer is one of a polycarbonate, a polypropylene, and a nylon.

In another aspect of the injection molded part, the film layer includes a printed graphic.

In another aspect of the injection molded part, the printed graphic is disposed above the main portion of the first polymer layer.

In another aspect of the injection molded part, the second polymer layer is a clear polycarbonate.

In another aspect of the injection molded part, the second polymer layer is in contact with the first side portion of the first polymer layer.

In another aspect of the injection molded part, a top surface of the first polymer layer is flush with the film outer surface.

A component for a motor vehicle is also provided. The component includes a substrate having a substrate top surface, a substrate first side surface, and a substrate second side surface, a transparent coating, and a film sandwiched between the substrate and the transparent coating, wherein the film has a main portion, a first side portion and a second side portion non-coplanar to the main portion, a film top surface, a film first side surface, and a film second side surface. A depth of the film measured from the film first side surface to a center of the film top surface is less than a depth of the substrate measured from the substrate first side surface to a center of the substrate top surface.

In one aspect of the component, the depth of the film measured from the film first side surface to a center of the film top surface is less than 10 mm and the depth of the substrate measured from the substrate first side surface to a center of the substrate top surface is greater than 11 mm.

In another aspect of the component, the substrate includes a center portion, a first side portion, and a first curved portion disposed between the center portion and the first side portion, and the film first side surface is substantially perpendicular to a tangent of the first side portion of the substrate.

In another aspect of the component, the transparent coating is in contact with the film top surface and the substrate top surface.

In another aspect of the component, the film and the substrate are substantially the same color.

In another aspect of the component, the substrate defines a step in contact with the film first side surface.

In another aspect of the component, the step includes a first surface perpendicular to a second surface.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a cross-section view of the injection molded part viewed in the direction of arrows 3-3 in FIG. 1;

FIG. 3A is an exploded, cross-section view of a portion of the injection molded part shown in FIG. 3;

FIG. 3B is an exploded, cross-section view of a portion of the injection molded part shown in FIG. 3.

DETAILED DESCRIPTION

The following description is merely exemplary in nature and is not intended to limit the present disclosure, application, or uses.

Figure 1:
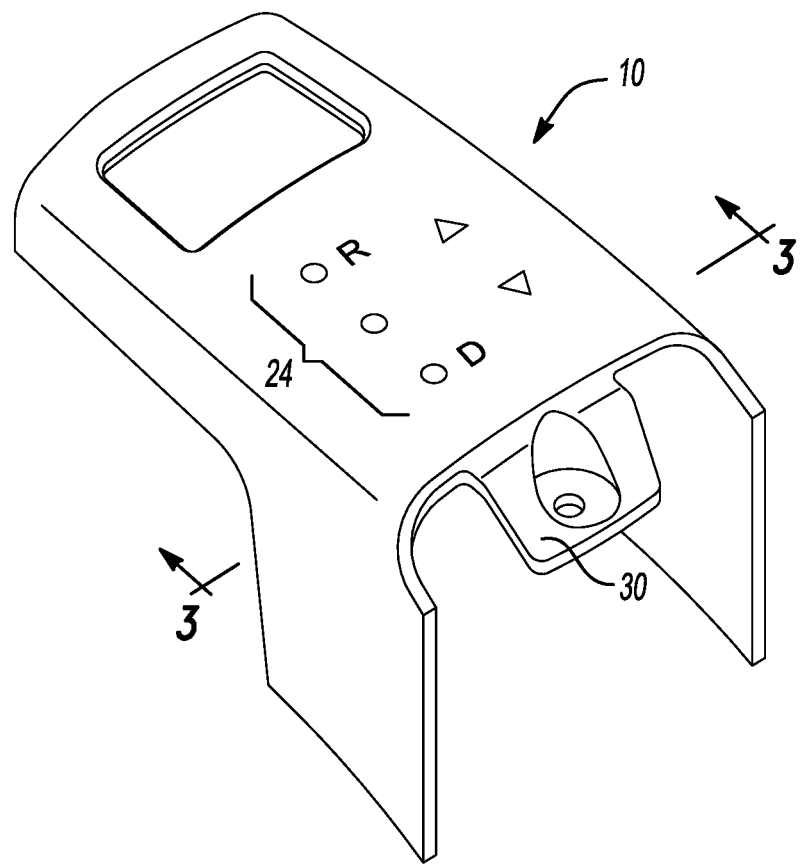
FIG. 1 is a top perspective view of an example of an injection molded part.
Figure 2:
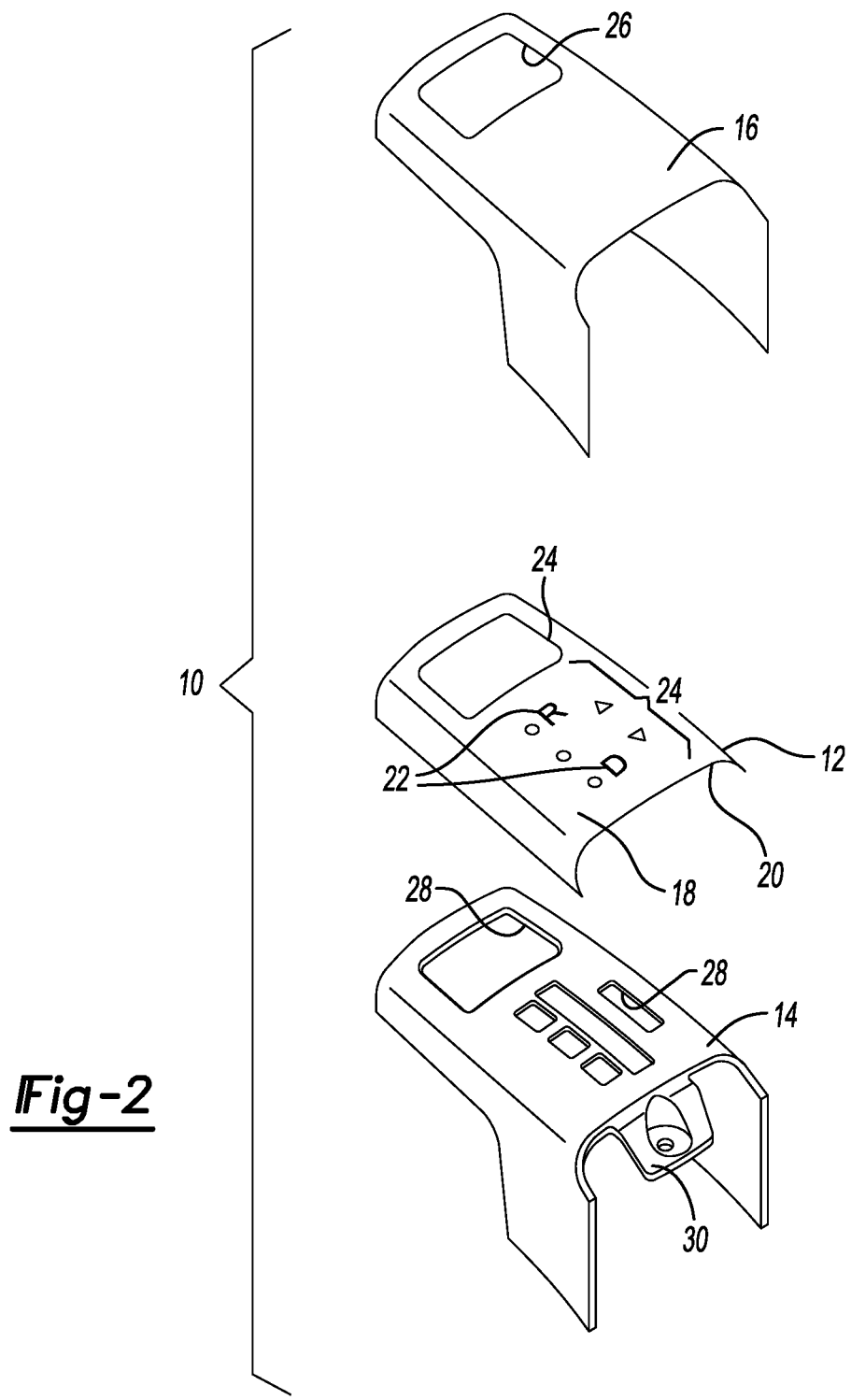
FIG. 2 is an exploded, top perspective view of the injection molded part shown in FIG. 1.

With reference to FIGS. 1 and 2, an injection molded part according to the principles of the present invention is generally indicated by reference number 10. The injection molded part 10 is illustrated, in the example provided, as an interior shifter trim part for use with a motor vehicle. However, it should be appreciated that the injection molded part 10 may take various other forms without departing from the scope of the present invention. Other examples include console trim parts, gauge trim parts, panels, shifter knobs, armrests or any other part that requires an insert film.

The injection molded part 10 generally includes a film layer or foil 12 sandwiched between a first polymer layer or substrate 14 and a second polymer layer or coating 16. The film layer 12 includes an outer or top surface 18 and an inner or bottom surface 20. The film layer 12 is used to provide information or decoration to the injection molded part 10. For example, the outer surface 18 may include a printed graphic 22 or any other decorative or informational markings and is generally opaque to match the color of the substrate 14. However, in the example provided, the film layer 12 also includes translucent portions 24. The film layer 12 is inserted into a mold (not shown) and the coating 16 is injected into the mold onto the top surface 18 of the film layer 16. The coating protects and covers the film layer 12. The coating 16 is preferably a clear, transparent coating of polycarbonate, though various other materials may be employed. The coating 16 may be formed to have any particular shape and to define particular features, for example a window 26. Next, using a second mold (not shown), the substrate 14 is injected into the mold onto the bottom surface 20 of the film layer 12. The substrate 14 is preferably a polycarbonate, a polypropylene, or a nylon, though various other materials may be employed. The substrate 14 provides strength to the part 10 and performs a fastening function. Like the coating 16, the substrate 14 may be formed to have any particular shape to define particular features, for example windows 28, an attachment bracket 30, etc. The windows 28 preferably align with the translucent portions 24 of the film layer 12 to allow illumination to be seen through the substrate and film layer 12.

Turning to FIG. 3, the film layer 12, the substrate 14, and the coating 16 are shown in greater detail. The film layer 12 includes a main portion 32 with a first side portion 34 and a second side portion 36 disposed opposite the first side portion 34. The main portion 32 defines a substantially curved or convex surface. The first side portion 34 and the second side portion 36 extend from the main portion 32. The main portion 32 transitions to the first side portion 34 via a first transition region 38. Likewise, the main portion 32 transitions to the second side portion 36 via a second transition region 40. The first side portion 34 ends at a first side surface 42 while the second side portion 36 ends at a second side surface 44. It should be appreciated that the first and second transition regions 38, 40 may be angled, rather than curved, without departing from the scope of the present example. The first side surface 42 and the second side surface 44 are canted outwardly from the main portion 32. A depth of the film layer 12 is defined as a distance from the outer surface 18 to one of the first or second side surfaces 42, 44, as measured perpendicular to a plane of the main portion 32, and is indicated by reference letter "d". The depth d of the film layer 12 is less than 10 mm.

As noted above, the substrate 14 is disposed on the inner surface 20 of the film layer 12. The substrate 14 completely covers the inner surface 20 of the film layer 12. The substrate 14 includes an outer surface 50 that contacts the film layer 12 and the coating 16 and an inner surface 52. The substrate 14 also includes a main portion 54, a first side portion 56 and a second side portion 58 disposed opposite the first side portion 56. The main portion 54 defines a curved or convex surface. The first side portion 56 and the second side portion 58 extend from the main portion 54. The main portion 54 transitions to the first side portion 56 via a first transition region 60. Likewise, the main portion 54 transitions to the second side portion 58 via a second transition region 62. The first side portion 56 ends at a first side surface 64 while the second side portion 58 ends at a second side surface 66. It should be appreciated that the first and second transition regions 60, 62 may be angled, rather than curved, without departing from the scope of the present example, and will generally conform to the shape of the inner surface 20 of the film layer 12. The first side surface 64 and the second side surface 66 are canted outwardly from the main portion 54.

A depth of the part 10 is defined as a distance from the outer surface 18 of the film layer 12 to one of the first or second side surfaces 64, 66 of the substrate 14, as measured perpendicular to a plane of the main portion 32 of the film layer 12, and is indicated by reference letter "D". The depth D of the part 10 is greater than the depth d of the film layer 12, i.e., greater than approximately 11 mm. Thus, the first and second side surfaces 64, 66 may extend past the first and second sides surfaces 42, 44 of the film layer 12. To camouflage the transition from the film layer 12 to the substrate 14, the film layer 12 and the substrate 14 are substantially the same color. In addition, the first and second side surfaces 42, 44 of the film layer 12 are preferably disposed at the midpoint of the first and second transition regions 60, 62 of the substrate 14, respectively.

The coating 16 is disposed overtop the outer surface 18 of the film layer 12 and overtop the exposed outer surface 50 of the substrate 14 and the exposed first and second side surfaces 42, 44 of the film layer 12, thus encapsulating the film layer 12. The coating 16 includes an outer surface 74 an inner surface 76 that contacts the film layer 12 and the substrate 14. The coating 16 also includes a main portion 78, a first side portion 80 and a second side portion 82 disposed opposite the first side portion 80. The main portion 78 defines a substantially curved or convex surface. The first side portion 80 and the second side portion 82 extend from the main portion 78. In the example provided, the coating 16 generally conforms to the cross-section shape of the film layer 12 and the substrate 14. In a preferred embodiment, the film layer 12 is inset into the coating 16 such that a thickness of the part 10 is constant throughout. Thus, the coating 16 has substantially the same thickness as that of the substrate 14 in areas without the film layer 12.

The main portion 78 transitions to the first side portion 82 via a first transition region 84. Likewise, the main portion 78 transitions to the second side portion 82 via a second transition region 86. The first side portion 80 ends at a first side surface 88 while the second side portion 82 ends at a second side surface 90. It should be appreciated that the first and second transition regions 84, 86 may be angled, rather than curved, without departing from the scope of the present example, and will generally conform to the shape of the outer surface 18 of the film layer 12 and the outer surface 50 of the substrate 14. The first and second side surfaces 88, 90 of the coating 16 may be coplanar with the first and second side surfaces 64, 66 of the substrate 14.

Since the coating 16 is injection molded onto the outer surface 18 of the film layer 12, a first step or ledge 92 and a second step or ledge 94 are formed in the inner surface 76 of the coating 16, as best seen in FIGS. 3A and 3B. The first step 92 includes a first surface 92A perpendicular to a second surface 92B. The second step 94 includes a first surface 94A perpendicular to a second surface 94B. The first step 92 contacts the first end surface 42 of the film layer 12 and the second step 94 contacts the second end surface 44 of the film layer 12.

As is shown by the preceding description, the injection molded part 10 camouflages the transition between the film layer 12 and the substrate at the first and second side surfaces 42, 44. By camouflaging the first and second side surfaces 42, 44 of the film layer 12, the injection molded part 10 may have a depth D much greater than the depth d of the film layer 12 without sacrificing the quality of the appearance as viewed through the transparent coating 16.

Figure 4:
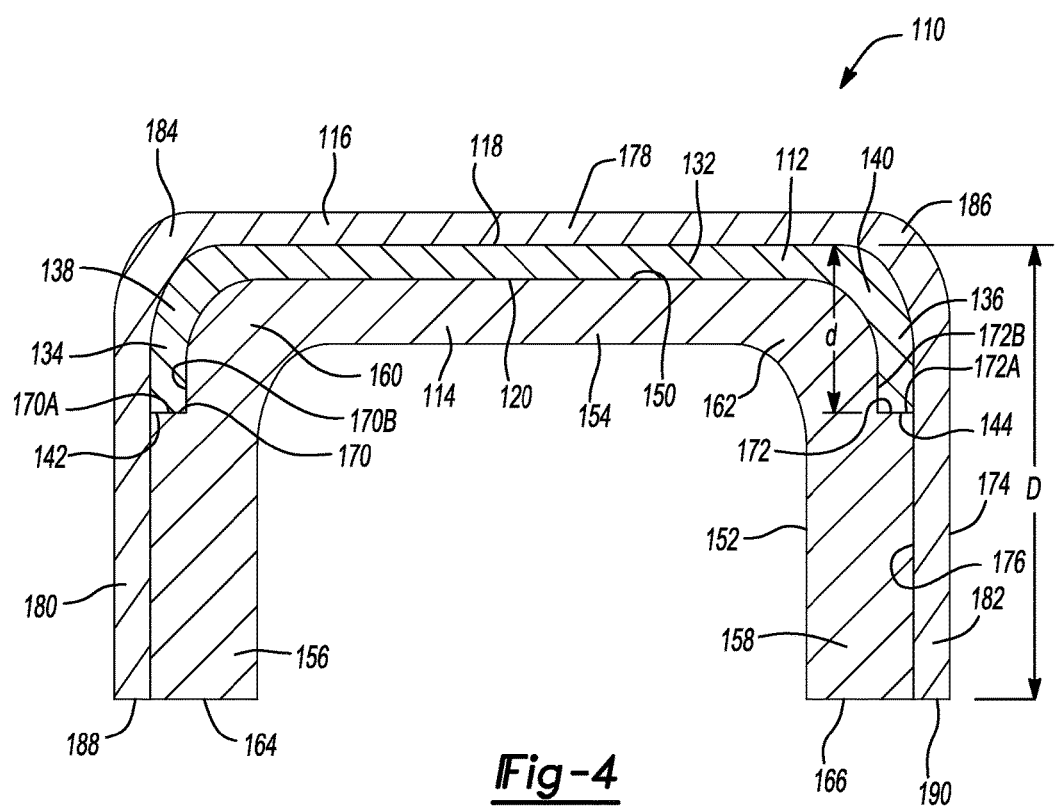
FIG. 4 is a cross-section view of another example of an injection molded part.

Turning to FIG. 4, an alternate injection molded part is generally indicated by reference number 110. The injection molded part 110 generally includes a film layer or foil 112 sandwiched between a first polymer layer or substrate 114 and a second polymer layer or coating 116, as described above in relation to the injection molded part 10.

The film layer 112 includes an outer or top surface 118 and an inner or bottom surface 120. The film layer 112 also includes a main portion 132 with a first side portion 134 and a second side portion 136 disposed opposite the first side portion 134. The main portion 132 defines a substantially planar surface. The first side portion 134 and the second side portion 136 extend from the main portion 132 at an angle with respect to the planar surface of the main portion 132 such that the first and second side portions 134, 136 do not lie upon the same plane as the main portion 132. Thus, in the example provided, the film layer 112 has a substantially "n" shaped cross-section. The main portion 132 transitions to the first side portion 134 via a first curved portion 138. Likewise, the main portion 132 transitions to the second side portion 136 via a second curved portion 140. The first side portion 134 ends at a first side surface 142 while the second side portion 136 ends at a second side surface 144. It should be appreciated that the first and second curved portions 138, 140 may be angled, rather than curved, without departing from the scope of the present example. The first side surface 142 is parallel, and preferably coplanar, to the second side surface 144. A depth of the film layer 112 is defined as a distance from the outer surface 118 to one of the first or second side surfaces 142, 144, as measured perpendicular to the plane of the main portion 132, and is indicated by reference letter "d". The depth d of the film layer 112 is less than 10 mm.

As noted above, the substrate 114 is disposed on the inner surface 120 of the film layer 112. The substrate 114 completely covers the inner surface 120 and the first and second side surfaces 142, 144, thus partially encapsulating the film layer 112. The substrate 114 includes an outer surface 150 that contacts the film layer 112 and the coating 116 and an inner surface 152. The substrate 114 also includes a main portion 154, a first side portion 156 and a second side portion 158 disposed opposite the first side portion 156. The main portion 154 defines a substantially planar surface. The first side portion 156 and the second side portion 158 extend from the main portion 154 at an angle with respect to the planar surface of the main portion 154 such that the first and second side portions 156, 158 do not lie upon the same plane as the main portion 154. Thus, in the example provided, the substrate 114 has a substantially "n" shaped cross-section. The main portion 154 transitions to the first side portion 156 via a first curved portion 160. Likewise, the main portion 154 transitions to the second side portion 158 via a second curved portion 162. The first side portion 156 ends at a first side surface 164 while the second side portion 158 ends at a second side surface 166. It should be appreciated that the first and second curved portions 160, 162 may be angled, rather than curved, without departing from the scope of the present example, and will generally conform to the shape of the inner surface 120 of the film layer 112. The first side surface 164 is parallel, and preferably coplanar, to the second side surface 166. The first and second side portions 156, 158 of the substrate 114 are coplanar to the first and second side portions 134, 136 of the film layer 112.

Since the substrate 114 is injection molded onto the inner surface 120 of the film layer 112, a first step or ledge 170 and a second step or ledge 172 are formed in the outer surface 150 of the substrate 114. The first step 170 includes a first surface 170A perpendicular to a second surface 170B. The second step 172 includes a first surface 172A perpendicular to a second surface 172B. The first step 170 contacts the first end surface 142 of the film layer 112 and the second step 172 contacts the second end surface 144 of the film layer 112.

A depth of the part 110 is defined as a distance from the outer surface 118 of the film layer 112 to one of the first or second side surfaces 164, 166 of the substrate 114, as measured perpendicular to the plane of the main portion 132 of the film layer 112, and is indicated by reference letter "D". The depth D of the part 110 is greater than the depth d of the film layer 112, i.e., greater than approximately 11 mm. Thus, the first and second side surfaces 164, 166 may extend past the first and second sides surfaces 142, 144 of the film layer 112. To camouflage the transition from the film layer 112 to the substrate 114, the film layer 112 and the substrate 114 are substantially the same color. In addition, the first and second side surfaces 142, 144 of the film layer 112 are preferably disposed perpendicular to the tangent of the first and second side portions 156, 158 of the substrate 114. Thus the first and second side surfaces 142, 144 are disposed below a midpoint of the first and second curved portions 160, 162 of the substrate 114.

The coating 116 is disposed overtop the outer surface 118 of the film layer 112 and overtop the exposed outer surface 150 of the substrate 114. The coating 116 includes an outer surface 174 an inner surface 176 that contacts the film layer 112 and the substrate 114. The coating 116 also includes a main portion 178, a first side portion 180 and a second side portion 182 disposed opposite the first side portion 180. The main portion 178 defines a substantially planar surface. The first side portion 180 and the second side portion 182 extend from the main portion 178 at an angle with respect to the planar surface of the main portion 178 such that the first and second side portions 180, 182 do not lie upon the same plane as the main portion 178. Thus, in the example provided, the coating 116 conforms to the generally cross-section shape of the film layer 112 and the substrate 114 and has a constant thickness throughout.

The main portion 178 transitions to the first side portion 182 via a first curved portion 184. Likewise, the main portion 178 transitions to the second side portion 182 via a second curved portion 186. The first side portion 180 ends at a first side surface 188 while the second side portion 182 ends at a second side surface 190. It should be appreciated that the first and second curved portions 184, 186 may be angled, rather than curved, without departing from the scope of the present example, and will generally conform to the shape of the outer surface 118 of the film layer 112 and the outer surface 150 of the substrate 114. The first side surface 188 is parallel, and preferably coplanar, to the second side surface 190. The first and second side surfaces 188, 190 of the coating 116 are also preferably coplanar with the first and second side surfaces 164, 166 of the substrate 114.

As is shown by the preceding description, the injection molded part 110 camouflages the transition between the film layer 112 and the substrate at the first and second side surfaces 142, 144. By camouflaging the first and second side surfaces 142, 144 of the film layer 112, the injection molded part 110 may have a depth D much greater than the depth d of the film layer 112 without sacrificing the quality of the appearance as viewed through the transparent coating 116.

The description of the invention is merely exemplary in nature and variations that do not depart from the gist of the invention are intended to be within the scope of the invention. Such variations are not to be regarded as a departure from the spirit and scope of the invention.

The invention claimed is:

1. An injection molded part for a motor vehicle comprising:
a film layer having a film main portion and a film first side portion that ends in a first film side surface, wherein the film side portion extends from the film main portion in a direction different than a plane defined by the film main portion, the film layer also having a film outer surface and a film inner surface disposed opposite the film outer surface;
a first polymer layer having a first polymer top surface in contact with the film inner surface, wherein the film layer is inset into the first polymer layer and forms a step within the first polymer layer, and the film outer surface is in alignment with the first polymer layer top surface; and
a second polymer layer in contact with the film outer surface and the first polymer layer, wherein the second polymer layer extends beyond the step.

2. The injection molded part of claim 1 wherein the first polymer layer includes a first side surface which extends past the film first side surface.

3. The injection molded part of claim 2 wherein a distance between the first side surface of the first polymer layer and the film outer surface is greater than 11 mm.

4. The injection molded part of claim 1 wherein the film layer includes a film second side portion extending from the main portion in a direction different than the plane defined by the film main portion, wherein the film second side portion ends in a second film side surface.

5. The injection molded part of claim 1 wherein the film inner surface is concave and the film outer surface is convex.

6. The injection molded part of claim 1 wherein the first polymer layer includes a first transition region disposed between the main portion and the film first side portion.

7. The injection molded part of claim 6 wherein the first transition region has an arcuate profile and the film first side surface is disposed substantially at a midpoint of the first transition region of the first polymer layer.

8. The injection molded part of claim 1 wherein the first polymer layer and the second polymer layer contact each other along a plane aligned with the film outer surface and in an area adjacent the film first side surface.

9. The injection molded part of claim 1 wherein the first polymer layer is one of a polycarbonate, a polypropylene, and a nylon.

10. The injection molded part of claim 1 wherein the film layer includes a printed graphic and a translucent portion.

11. The injection molded part of claim 10 wherein the printed graphic is disposed above the main portion of the first polymer layer.

12. The injection molded part of claim 1 wherein the second polymer layer is a clear polycarbonate.

13. The injection molded part of claim 7 wherein the second polymer layer is in contact with the first transition region of the first polymer layer.

14. A component for a motor vehicle comprising:
a substrate having an outer surface that defines a step having a first surface perpendicular to a second surface;
a transparent coating; and
a film sandwiched between the substrate and the transparent coating, wherein the film has an opaque portion that matches the substrate and a translucent portion, a film first side surface, and a film second side surface, wherein the film is inset into the substrate and disposed within the step such that a film outer surface is flush with the substrate outer surface, and
wherein the substrate and the transparent coating contact each other continuously along two sides adjacent and in general alignment with the film first side surface and the film second side surface.

15. The component of claim 14 wherein a depth of the film measured from the film first side surface to a center of a film top surface is less than 10 mm and a depth measured from ends of the substrate and the transparent coating to a center of the transparent coating is greater than 11 mm.

16. The component of claim 14 wherein the substrate includes a center portion, a first side portion, and a first curved portion disposed between the center portion and the first side portion, and the film first side surface is substantially perpendicular to a tangent of the first side portion of the substrate.

17. The component of claim 14 wherein the transparent coating is in contact with a film top surface and a substrate top surface.

18. The component of claim 14 wherein the film and the substrate are substantially the same color.

19. An injection molded part for a motor vehicle comprising:
a film layer having a film main portion and a film first side portion that ends in a first film side surface, wherein the film side portion extends from the film main portion in a direction different than a plane defined by the film main portion, the film layer also having a film outer surface and a film inner surface disposed opposite the film outer surface, wherein the film inner surface is concave and the film outer surface is convex;

a first polymer layer in contact with the film inner surface, wherein the film layer is inset into the first polymer layer; and a second polymer layer in contact with the film outer surface and the first polymer layer, and wherein the first polymer layer and the second polymer layer contact each other along a plane aligned with the film outer surface and in an area adjacent the film first side surface, and wherein the second polymer layer is not inset into the first polymer layer.

\* \* \* \* \*